July 4, 1967  G. DE COYE DE CASTELET  3,329,230

TORSION-BAR SUSPENSION SYSTEMS FOR ENGINES

Filed Nov. 30, 1964

Inventor
Gaëtan de Coye de Castelet
By Stevens, Davis, Miller & Mosher
Attorneys

United States Patent Office 3,329,230
Patented July 4, 1967

---

3,329,230
TORSION-BAR SUSPENSION SYSTEMS FOR ENGINES
Gaëtan de Coye de Castelet, Billancourt, France, assignor to Regie Nationale des Usines Renault, Billancourt, France
Filed Nov. 30, 1964, Ser. No. 414,588
Claims priority, application France, Dec. 28, 1963, 958,769
2 Claims. (Cl. 180—64)

This invention relates to the elastic mounting of an engine on a motor vehicle chassis, and more particularly to a type of mounting in which the engine is suspended from the chassis through the medium of torsion bars.

It has been discovered that great flexibility in the suspension members improves the filtered effect on the engine vibrations transmitted to the body.

The present invention therefor consists in utilizing a preferably single torsion bar which enables the desired aim to be achieved, yet avoids certain drawbacks encountered with all-rubber suspension members, examples of which are ageing, creep and the like.

An embodiment of an engine suspension system according to the present invention will now be more particularly described with reference to the accompanying drawing, in which.

Figure 1:
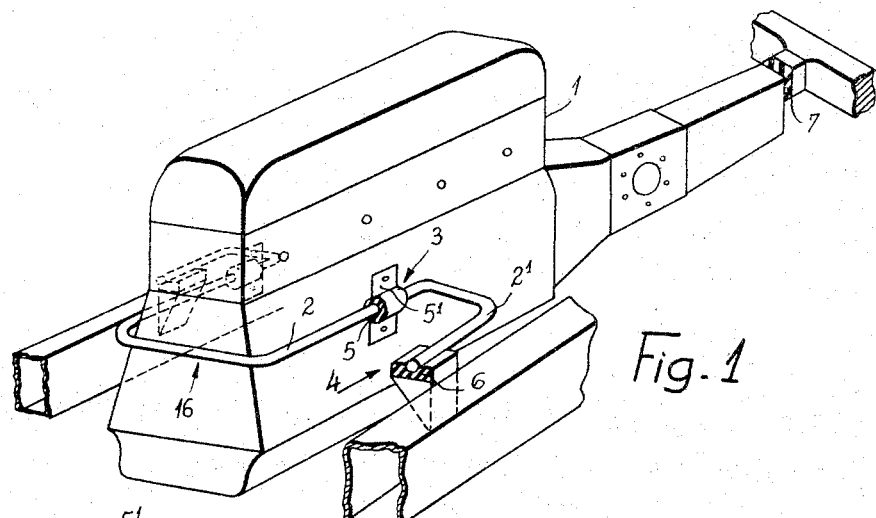
FIGURE 1 is an overall view of an engine suspension system according to the invention.

Referring now to the accompanying drawing, the engine 1 shown therein is supported by a torsion bar 2 which, in the specific example illustrated, is shaped as a U which hugs the engine and whose branches $2^1$ have their ends similarly bent into U-shape. The torsion bar has its central section secured to the engine as at 3 and its two extremities fixed to the chassis 4. The connections as at 3 and 4 are made with rubber inserts 5 and 6, the insert 5 being provided on the engine crankcase bracket $5^1$, and the insert 6 on the chassis. On the chassis the extremities $2^1$ bear through the medium of shaped plates $6^1$ resting on the rubber insert 6. The third anchoring point, denoted by reference numeral 7, is disposed at the end of the gearbox, on a cross-member, and consists of a conventional rubber element.

In addition to affording the advantage of great flexibility, this mounting system restricts the sideways motion of the engine which occurs on the road when negotiating bends.

Figure 2:
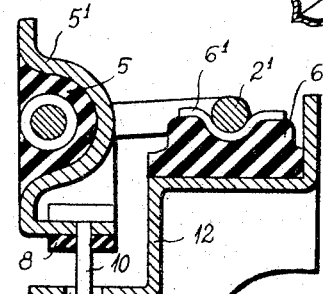
FIGURE 2 shows in section through a plane perpendicular to the chassis a detail of the manner of mounting the torsion bar on the chassis.

Vertical engine play is limited by additional elastic stops 8 and 9 (see FIGURE 2), the stops 8 being secured to the bracket $5^1$ while a rod 10, which is supported by said bracket and is slidable through an opening 11 in the supporting member 12 of the chassis, carries the stop 9.

Figure 3:
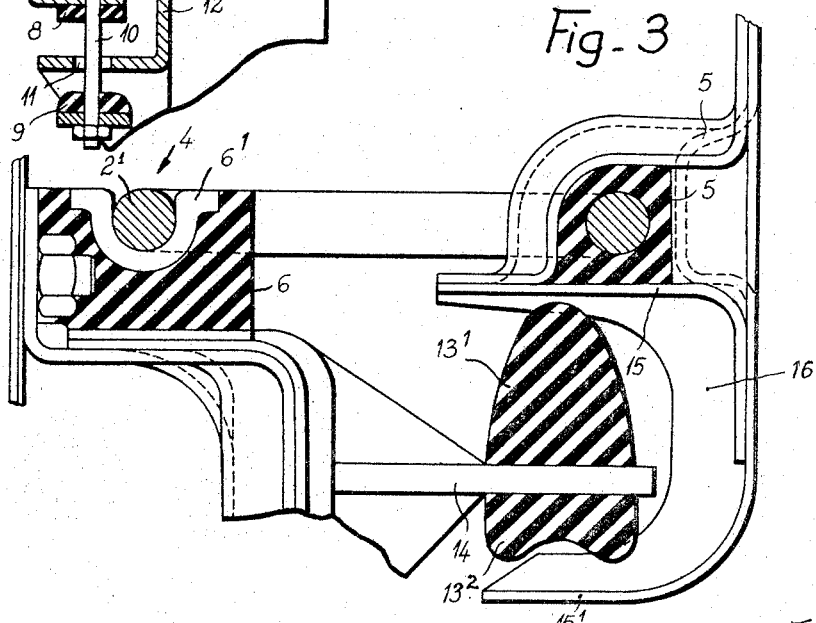
FIGURE 3 shows an alternative method of mounting said torsion bar.

The abutment system shown in FIGURE 3 is particularly advantageous since it provides dual rubber abutments (one on each side of the engine crankcase piece 14), the upper abutment $13^1$ being of larger size than the lower abutment $13^2$. This dual abutment is mounted between the flanges 15, $15^1$ of the rib of the chassis support 16. The abutment $13^1$ is designed to limit pulling movement during acceleration, and the abutment $13^2$ to limit the movements of lesser magnitude which occur when reversing or under the retarding effect of the engine.

It should be noted that the torsion bar extremity $2^1$ merely rests on the chassis as at 4, where it is normally preloaded to a certain extent by the weight of the engine.

In order to prevent accidental shifting of the central portion of the torsion bar 2, the latter may be secured to the back of the engine, as at 16, in cases where the type of mounting shown in FIGURE 1 is used.

What is claimed is:
1. An apparatus for suspending an engine on the frame of a vehicle, said apparatus comprising a U-shaped bar extending along both sides and across one end of the engine; means resiliently connecting the legs of said bar to a corresponding side of said engine, each leg of said bar being provided with a U-shaped extension extending in a direction opposite to the direction of said bar; means resiliently connecting the free end of each of said extensions to the vehicle frame, and means providing a third anchoring point of said engine to said vehicle frame.

2. The apparatus of claim 1, further comprising at least one auxiliary elastic stop disposed between the engine crankcase and a member rigid with the vehicle frame to limit vertical engine movement.

References Cited
UNITED STATES PATENTS

| | | | |
|---|---|---|---|
| 2,209,457 | 7/1940 | Hare | 180—56 |
| 3,052,435 | 9/1962 | Roller | 248—8 |
| 3,139,152 | 6/1964 | Bajer | 180—64 |

BENJAMIN HERSH, *Primary Examiner.*

MILTON L. SMITH, *Examiner.*